United States Patent Office 2,769,629
Patented Nov. 6, 1956

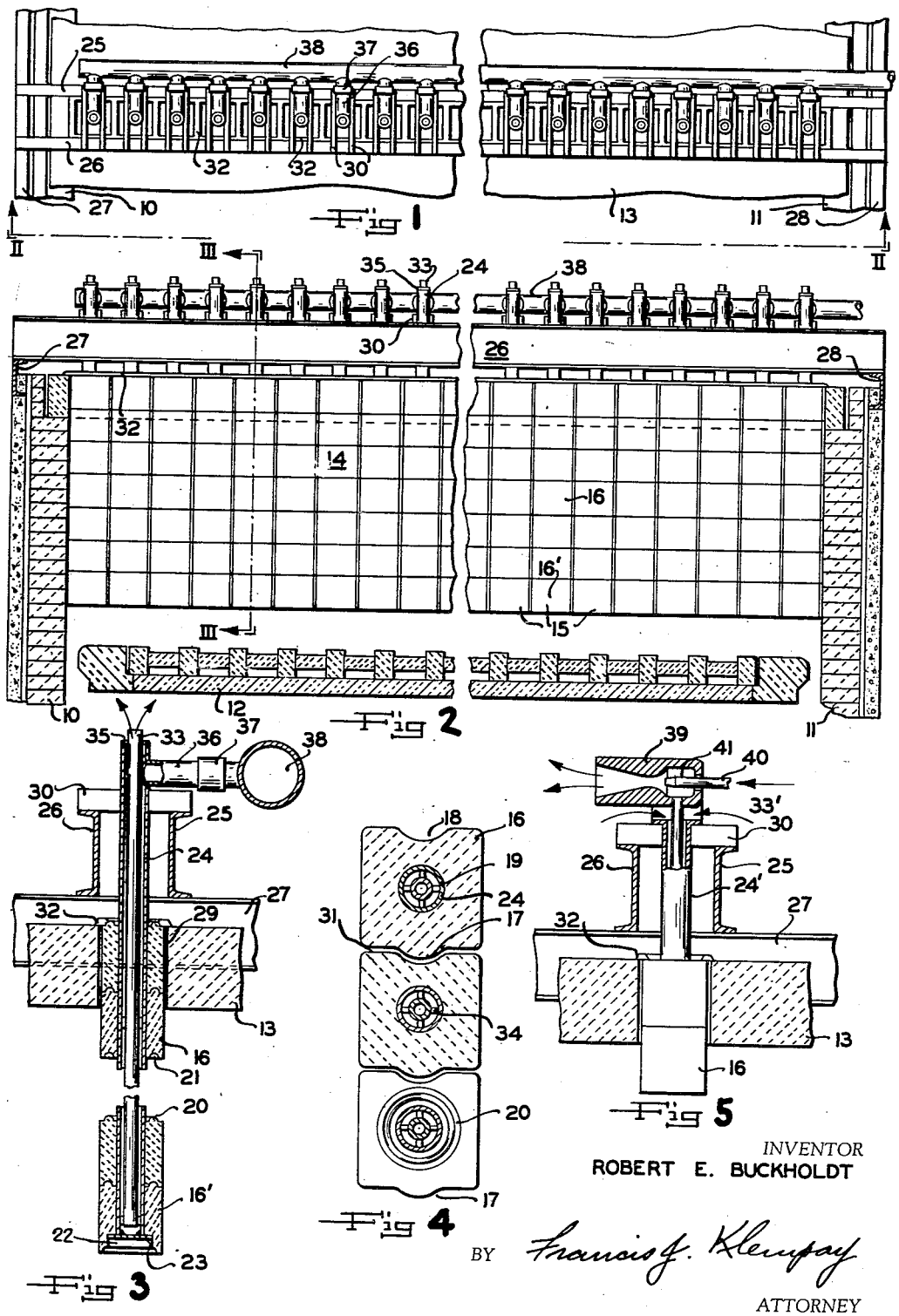

2,769,629

BAFFLE WALL CONSTRUCTION, PARTICULARLY FOR ROTARY HEARTH FURNACES

Robert E. Buckholdt, Salem, Ohio, assignor, by mesne assignments, to Salem-Brosius, Inc., a corporation of Pennsylvania Application December 13, 1951, Serial No. 261,410

6 Claims. (Cl. 263—46)

The present invention relates generally to industrial heat treating furnaces and more particularly to novel arrangements for constructing refractory baffle walls therein.

In certain types of furnaces, particularly rotary hearth types, the baffle walls used therein must be supported wholly from the side walls and/or roof of the furnace rather than from the hearth. The depending baffle structure is, of course, weaker than one having a stable base and heretofore particularly where very high temperatures are required, the frangible refractory material becomes cracked and broken through expansion and contraction, causing collapse or substantial weakening of the wall structure. It is accordingly the primary object of this invention to provide a novel refractory baffle wall construction whereby strong depending structures are rendered possible which are substantially unaffected by high temperatures and by the expansion and contraction resulting therefrom.

More particularly it is an object of this invention to provide a practical refractory baffle wall construction wherein the frangible refractory material used therein is supported wholly at its base by means of non-frangible and non-refractory means depending from the room of the furnace or heating chamber. The arrangement thus provides for supporting the weak and easily breakable refractory material in the manner which has been found to be most structurally sound.

Arrangements as above set forth for constructing refractory walls have, of course, been heretofore proposed, but have been impractical for use at high temperatures since the non-frangible, non-refractory means—usually steel—often weakens and softens, causing the entire wall to collapse. It is therefore another object of this invention to provide a novel means for supporting a refractory wall by means of non-refractory material wherein provisions are included for maintaining the temperature of the non-refractory material at a relatively low value whereby the advantageous structural properties of the non-refractory material are retained substantially regardless of the temperature of the refractory material.

In conjunction with the above objects it is a further object of this invention to provide a novel refractory wall construction of the type described wherein the non-refractory supporting means therefor is isolated insofar as practical from the direct heat of the furnace or heating chamber whereby the cooling load for maintaining the non-refractory material at a low temperature is substantially reduced.

Another object of this invention is the provision of a baffle wall construction as above described wherein a complete wall structure is comprised of a plurality of spaced laterally adjacent sections, each supported wholly independently of the others whereby each of said sections is free to expand or contract independently of the others. This arrangement is advantageous in that uneven expansion or construction, as is likely to occur in heating or cooling the furnace to a desired operating temperature, may be absorbed independently in each section whereby, for example, high expansion in the centermost sections of a wall expanse will not create undue stresses in outer sections which have not yet attained operating temperature.

Another object of this invention includes the provision for constructing a baffle wall as above described of a refractory block of novel design wherein are incorporated certain features for interlocking horizontally adjacent blocks to prevent direct radiation of heat therebetween while still providing ample clearance between the blocks to absorb the expansion thereof, and certain other features for interconnecting vertically adjacent blocks of each section in such manner that the blocks will tend to remain in their assembled positions even though they have become cracked and broken through use.

Other objects and advantages of the invention will become apparent upon full consideration of the following detailed specification and accompanying drawing wherein is disclosed a certain preferred embodiment of the invention.

In the drawing:

Figure 1 is a fragmentary plan view of a conventional rotary hearth heat treating furnace wherein is utilized a baffle wall constructed according to the principles taught by my invention;

Figure 2 is a fragmentary section view taken along line II—II of Figure 1;

Figure 3 is a fragmentary section view of the apparatus of Figure 1 taken, for example, along line III—III of Figure 2;

Figure 4 is an enlarged fragmentary plan view, partly in section, of the component refractory blocks utilized as taught by my invention in constructing a baffle wall as shown in Figures 1 and 2; and Figure 5 is an enlarged fragmentary view of a second embodiment of my invention showing an optional arrangement for maintaining the non-refractory supporting members at a low temperature.

Referring to the drawing and particularly to Figures 1 and 2 thereof, the numerals 10 and 11 represent radially spaced annular side walls of a conventional rotary hearth furnace. A roof 13 therefor is supported by the side walls 10 and 11 as shown in Figure 2, and an annular hearth 12 having suitable means of support, not shown, and motivating means, also not shown, is positioned between the walls 10 and 11 at the base thereof. In accordance with usual practice a plurality of circumferentially spaced baffle walls, as at 14, are provided about the annular extent of the furnace to divide the same into a like plurality of heating zones or chambers. Objects to be heated, not shown, are placed on the movable hearth 12 and carried about the furnace, usually in the direction of progressively hotter heating zones, by the movement of the hearth 12. In order that the objects to be heated may freely pass from zone to zone a vertical clearance must be provided between the hearth 12 and baffle wall 14 as shown in Figure 2.

A baffle wall 14 constructed in the manner taught by my invention comprises a plurality of vertically disposed wall sections 15. It is contemplated that the width of such sections 15 will be standard for substantially all applications therefor whereby baffle walls of various widths may be constructed by installing an appropriate number of sections 15 as will be understood.

In the preferred form each of the sections 15 comprises a plurality of vertically aligned refractory blocks 16. The blocks 16 may be cast or extruded from light weight refractory material into the form shown in Figures 3 and 4. In horizontal cross section the blocks 16 are generally of rectangular outline and have formed therein on two opposite sides, vertically disposed complementary tongue and groove portions 17 and 18 respectively. A vertically disposed bore 19 is also provided in the blocks 16 substantially centrally therein for the purpose of receiving non-refractory supporting means to be hereinafter described. On the generally flat upper and lower surfaces of the blocks 16 are formed complementary annular tongue and groove portions 20 and 21 respectively whereby the blocks 16, when assembled into vertically superimposed relation, will be interlocked to substantially prevent horizontal relative movement between adjacent blocks.

As shown in Figure 3, the lowermost block 16' of a wall section of vertically superimposed blocks 16 is provided with a recess 22 extending vertically upward from the lower surface of the block 16'. The recess 22 is adapted to receive a flanged end cap member 23 of steel or other suitable non-refractory material, which end cap 23 is welded or otherwise secured to the lower end extremity of a pipe member 24 also of non-refractory material. As will be observed from Figures 3 and 4, the pipe member 24 is adapted to be freely received in the bores 19 of the refractory blocks 16, preferably with enough clearance to provide for the differential expansion between the non-refractory pipe member 24 and the blocks 16 as will be understood.

To assemble a wall section 15 a plurality of blocks 16 are transfixed on the pipe member 24, the lowermost block 16' resting on the end cap 23 and other vertically superimposed blocks 16 each resting on the block immediately below. The sections 15 may be assembled to any desired height by merely superimposing an appropriate number of blocks 16 as will be understood.

To assemble a plurality of wall sections 15 to form a wall expanse as shown at 14 I provide a transversely disposed slot or opening 29 in the roof 13 whereby the independent sections 15 may be inserted from above and placed in side-by-side relation as shown in Figure 2. For supporting the sections 15 I prefer a pair of spaced parallel I-beam or channel members 25 and 26 which are mounted above the roof 13 substantially in vertical alignment with the opening 29 as appears in Figure 3. According to the principles of the invention the pipe members 24 extend substantially above the uppermost block 16 of a wall section 15 and to the upwardly protruding portion of the said member 24 transversely disposed bars 30 may be welded or otherwise suitably secured. Thus to assemble the sections 15 into a wall expanse 14 the individual pre-assembled sections are merely lowered through the opening 29 until the transversely disposed bars 30 rest upon the channel members 25 and 26. The bars 30 may be secured to the supporting channel members 25 and 26 if desired, but are preferably merely rested upon the channels 25 and 26; the weight of the sections being sufficient to retain them in position as assembled.

To allow for expansion of the blocks 16 it is desirable to provide a slight clearance 31 between adjacent sections 15. For example, a clearance in the order of one percent of the width of the blocks 16 should be provided where furnace temperatures in the order of 2500° F. are contemplated. Thus to prevent direct radiation of heat from a high temperature zone or chamber to an adjacent lower temperature zone I have provided complementary tongue and groove portions 17 and 18 which, when arranged as shown in Figure 4, coact to obstruct the clearance passage 31. The same clearance is of course provided between the tongue 17 and groove 18 of adjacent blocks; their function being merely to provide a discontinuity in the passage 31 to block off radiation rays which necessarily travel in straight lines.

Suitable clearance should also be provided at the roof opening 29 and to prevent the escape of hot furnace gases therethrough I provide a conventional seal 32 of any suitable material which is positioned loosely over the clearance opening between the roof 13 and wall 14 and over the clearance opening the uppermost horizontally adjacent blocks 16.

It is of course contemplated that various of the blocks 16 may become cracked or broken through prolonged usage or other causes and to provide for this eventuality interlocking annular tongue and groove portions 20 and 21 are formed in the upper and lower surfaces respectively of each block 16 whereby in a section 15 of superimposed blocks 16 each of the blocks will be securely interconnected to blocks immediately above and below. The arrangement thus described provides that in the event a certain block becomes cracked it will not simply fall away from the pipe member 24 leaving a void in the baffle wall, but rather will be retained in position by the interconnected blocks immediately above and below. It will be understood, of course, that expansion clearance need not be provided between vertically superimposed blocks since the same are free to slide vertically along the pipe member 24. Thus the tongue and groove portions 20 and 21 may be closely interfitted and accordingly well adapted to perform the function desired.

As hereinbefore explained it is of utmost importance in a structure of this type to maintain the non-refractory supporting member—pipe member 24 in the instant illustration—at a relatively low temperature in order to prevent the softening thereof and loss of its advantageous structural properties through softening. This must be provided for since the surface temperature of the blocks often reaches 2500° F. and higher and has heretofore been one of the principal reasons for the impracticability of using non-refractory supporting means in baffle walls of this type. In the construction as taught by my invention this problem is easily overcome by providing a second pipe member 33 of substantially smaller diameter than the supporting pipe member 24, which is inserted within the last mentioned member 24 in concentricity therewith as shown in Figure 4. The smaller pipe member 33 is inserted within the member 24 to a point spaced vertically above the end cap 23 and is longitudinally dimensioned to protrude slightly above the upper end of the larger pipe 24. A plurality of spacer members 34 are preferably provided to maintain the pipes 24 and 33 in concentricity and the said spacers 34 or other suitable means may be used to secure the pipes in the proper longitudinal relationship as shown in Figure 4. In the embodiments herein shown the pipe 33 is open at both its upper and lower ends while the pipe 24 is closed at its lower end by end cap member 23 and at its upper end by an annular end cap 35 which is adapted to fit over the smaller pipe 33 and to close off the annular opening therearound. Connecting the larger pipe member 24 near the upper end portion thereof is a short conduit 36 which is in turn connected through a flexible coupling 37 to a header conduit 38. The last mentioned conduit 38 is connected by any suitable means to a source of air under pressure, not shown, whereby air may be caused to flow into the pipe member 24 through conduit 36, thence downwardly through the annular space between pipe members 24 and 33, and finally upwardly through pipe member 33 to be discharged into the atmosphere. As will be understood, the air flowing downwardly along the inner surface of pipe member 24 will absorb and remove heat therefrom and by appropriately regulating the volume of air flow the pipe member 24 may be maintained at a desired operating temperature substantially regardless of the temperature within the heating zones or chambers defined by the baffle wall 14. If desired the heated air discharged at the upper end of pipe member 33 may be collected in a suitable header, not shown, for use in supporting combustion within the furnace.

In Figure 5 I have shown a second embodiment of the invention wherein provisions are made for causing the proper convection flow through pipe members 24 and 33 without direct contact or connection between the hot pipe members and the source of air supply. In this embodiment the supporting pipe member 24' is open to the atmosphere at its upper end while the pipe member 33' communicates at its upper end with a low pressure point of a venturi 39. A conduit 40 having a jet nozzle 41 at its open end is suitably connected to the source of air under pressure, not shown, and to obtain the proper circulation through the pipe members 24 and 33 air may be forced through the venturi 39 to create a low pressure therein whereby atmospheric air is forced downwardly through pipe member 24 and upwardly through pipe member 33 in the manner desired. This embodiment is advantageous in the respect that no direct path is provided through which heat may be conducted from the hot pipe members 24 and 33 to the source of air supply, while the first described embodiment provides more efficient circulation of air. The various considerations of each installation would thus determine the embodiment most applicable for use therein.

It should now be apparent that I have accomplished the objects initially set forth. The baffle construction disclosed and described herein provides simple, inexpensive and wholly practical means for supporting a depending refractory wall by means of non-frangible and non-refractory material whereby the refractory wall is supported at its base in a manner most sound from a structural standpoint. Overheating and softening of the non-refractory supporting means, heretofore the cause for much concern in structures of this type, is avoided through the novel arrangement of pipe members 24 and 33, the larger of which, pipe member 24, is in direct contact with and acts as a support for the refractory blocks 16. By forcing air through the annular space between the two said pipe members 24 and 33 the supporting pipe member 24 may be maintained at a safe operating temperature, and by merely increasing or decreasing such flow of air changes in furnace temperature may be easily compensated for.

An additional feature of the baffle construction disclosed herein which lends materially to its practicability resides in the combination of a vertically disposed pipe member 24 with refractory blocks 16 transfixed thereon. The pipe member 24 is thus shielded from the direct heat of the furnace over its entire length and the cooling load required to maintain the said pipe member 24 at a practical operating temperature is kept at a minimum. By my arrangement the only non-refractory material which is exposed to the direct heat of the furnace is the small end cap member 23 which may readily and inexpensively be made of suitable alloy steel having good structural properties at high temperatures. Obviously, if desired, the cap members 23 may be covered by refractory blocks or discs, not shown, which are received and suitably retained in the recesses in which the cap members 23 are housed.

In the construction disclosed, wherein the refractory blocks 16 are apertured to receive the pipe member 24, I have included provisions for keeping the blocks 16 in place in the event that they become cracked or broken. The above mentioned provisions include the interlocking annular tongue and groove portions 20 and 21 formed on the upper and lower surfaces respectively of the blocks 16 whereby each block, with the exception of the extreme upper and lower blocks, will be held in place by blocks immediately above and below. Thus, even though various blocks become cracked after a time the same will be held in place by the other intact blocks until such time as they may be replaced at regular maintenance periods.

Construction of an entire baffle wall expanse is extremely simple by the teachings disclosed herein since each of the vertical sections 15 is wholly independent of the others and may be assembled and disassembled without affecting any of the others. Provisions for horizontal expansion and contraction of the refractory blocks may be made by merely allowing a space of, for example, an eighth of an inch between adjacent sections, and it will be understood that by isolating the expansion and contraction movements of each of the various sections wholly within the sections themselves high stresses on the frangible refractory blocks are virtually eliminated. Direct radiation of heat through the space between adjacent sections may be prevented by the expedient of providing complementary tongue and groove portions, as at 17 and 18, whereby the clearance space does not provide a straight line path for the passage of radiation rays.

It will, of course, be understood that the embodiments of my invention herein disclosed and specifically described are intended to be illustrative only and reference should therefore be had to the appended claims in determining the true scope of the invention.

I claim:

1. A baffle wall structure for heating furnaces and the like comprising a plurality of vertical wall sections disposed in side-by-side relation to form a wall expanse; each of said vertical wall sections comprising in combination a first vertically disposed pipe member secured at its upper portion and depending downwardly into a heating chamber, an end cap member secured to and closing off the lower end of said first pipe member, said end cap member extending radially outward from said first pipe member, a plurality of generally single rectangular refractory blocks having centrally located vertically disposed apertures therein transfixed in superimposed relation on said first pipe member, the lowermost of said refractory blocks being supported by the radially extending portion of said end cap member, said radially extending portion being generally narrower than said blocks, said refractory blocks having interlocking annular tongue and groove portions in their top and bottom surfaces disposed substantially circumferentially about said first pipe member, the arrangement being such that the tongue portions of certain of said blocks interlock with the groove portions of vertically adjacent blocks, a second pipe member of lesser outside diameter than the inside diameter of said first pipe member positioned within said first pipe member substantially in concentricity therewith, the lower end extremity of said second pipe member being positioned a predetermined distance above said end cap member, cap means positioned around said second pipe member and secured to the upper end portions of said first and second pipe members to close off the annular opening therebetween, and conduit means communicating with said first pipe member near the upper portion thereof and adapted to be connected to a source of air under pressure whereby air may be caused to flow downwardly through the annular space between said first and second pipe members and upwardly through said second pipe member.

2. A baffle wall structure for heat treating furnaces and the like comprising a plurality of vertical wall sections disposed in side-by-side relation to form a wall expanse; each of said vertical wall sections comprising in combination a first vertically disposed pipe member secured at its upper portion and depending downwardly into a heating chamber, means to close off the lower end opening of said first pipe member, a plurality of generally single rectangular refractory blocks having centrally located vertically disposed apertures therein transfixed in superimposed relation on said first pipe member, means secured to the lower end portion of said first pipe member and extending radially outward thereof for supporting the lowermost of said blocks, said last-mentioned means being generally narrower than said blocks, said refractory blocks having interlocking annular tongue and groove portions in their top and bottom surfaces disposed about said first pipe member, the arrangement being such that the tongue portions of certain of said blocks interlock with the groove portions of vertically adjacent blocks, a second pipe member of lesser outside diameter than the inside diameter of said first pipe member positioned within said first pipe member substantially in concentricity therewith, the lower end extremity of said second pipe member being in communication with the annular space between said first and second pipe members near the lower end portion of said first pipe member, means closing off said annular space near the upper end extremity of said first pipe member, and conduit means communicating with said first pipe member near the upper portion thereof and adapted to be connected to a source of air under pressure whereby air may be caused to flow downwardly through the annular space between said first and second pipe members and upwardly through said second pipe member.

3. A baffle wall structure for heat treating furnaces and the like comprising a plurality of vertical wall sections disposed in side-by-side relation to form a wall expanse; each of said vertical wall sections comprising in combination a first vertically disposed pipe member secured at its upper portion and depending downwardly into a heating chamber, means to close off the lower end opening of said first pipe member, a plurality of generally individual rectangular refractory blocks having centrally located vertically disposed apertures therein transfixed in superimposed relation on said first pipe member, means secured to the lower end portion of said first pipe member and extending radially outward thereof for supporting the lowermost of said blocks, said last-mentioned means being generally narrower than said blocks, interlocking means on the upper and lower surfaces of said blocks whereby said relative horizontal displacement between vertically adjacent blocks is restrained, a second pipe member of lesser outside diameter than the inside diameter of said first pipe member positioned within said first pipe member substantially in concentricity therewith, the lower end of said pipe member being in communication with the annular space between said first and second pipe members, means for creating a pressure differential between the upper end opening of said second pipe member and the upper portion of said annular space whereby air is caused to flow downwardly through said space and upwardly through said second pipe member.

4. A baffle wall structure for heat treating furnaces and the like comprising a plurality of vertical wall sections disposed in side-by-side relation to form a wall expanse; each of said vertical wall sections comprising in combination a vertically disposed non-refractory tubular member secured at its upper portion and depending downwardly in a heating chamber, said member being closed off at its lower end, a plurality of substantially individual refractory blocks having centrally located vertically disposed apertures therein transfixed in superimposed relation on said tubular member, means secured substantially solely to said tubular member for supporting the lowermost of said blocks, said last-mentioned means being generally narrower than said blocks, conduit means inserted within said tubular member substantially to the lower end thereof, said conduit means being substantially smaller than said tubular member whereby a clearance space is provided therebetween, and means to create a pressure differential between said conduit means and the upper end portion of said tubular means whereby air is caused to flow downwardly through said clearance space and return through said conduit means.

5. A baffle wall structure for heat treating furnaces and the like comprising a plurality of relatively narrow vertical wall sections disposed in side-by-side relation to form a wall expanse; each of said vertical wall sections comprising in combination a vertically elongated and disposed non-refractory means secured at its upper end and depending downwardly in a heating chamber, a plurality of refractory blocks having centrally located vertically disposed apertures therein transfixed in superimposed relation on said non-refractory member, said plurality of refractory blocks being generally entirely supported by said non-refractory means, said non-refractory means being generally narrower than the blocks in its respective section and having passages therein adapted to carry a fluid downwardly toward the lower end portion of said non-refractory member and thence upwardly therefrom.

6. The combination with a heating furnace having side walls and a roof of a pair of spaced substantially parallel beam members supported over said roof, said roof having an opening therein below the space between said beam members, a plurality of vertical baffle wall sections adapted to be inserted through said space and said opening in side-by-side relation to form a wall expanse extending transversely between said walls below said roof, adjoining wall sections having vertically extending clearances therebetween; each of said vertical wall sections comprising a non-refractory tubular supporting member, a plurality of substantially individual refractory blocks having centrally located vertically disposed apertures therein transfixed in superimposed relation on said tubular member, means secured substantially solely to the lower end portion of said tubular member for supporting the lowermost of said blocks, said last-mentioned means being generally narrower than said blocks, said plurality of blocks extending substantially from said last-mentioned means to said roof, means secured to the upper portion of said tubular member generally transversely thereto adapted to rest upon said beam members to support said wall section, means associated with a source of fluid under pressure for causing fluid to flow along the inner peripheral surface of said tubular member to cool the same, said last mentioned means including a second tubular member of lesser outside diameter than the inside diameter of said first mentioned tubular member, the lower end of said second tubular member being in communication with the annular space between said first and second tubular members and means connecting said source of fluid under pressure with said annular space near the upper portion thereof whereby fluid is caused to flow downwardly along the inner peripheral surface of said first tubular member and upwardly through said second tubular member.

References Cited in the file of this patent

UNITED STATES PATENTS

| | | |
|---|---|---|
| 624,270 | Vrooman | May 2, 1899 |
| 1,295,796 | Roberts | Feb. 25, 1919 |
| 1,498,875 | Howard | June 24, 1924 |
| 1,751,188 | Bennis | Mar. 18, 1930 |
| 1,775,414 | Tone | Sept. 9, 1930 |
| 2,267,864 | Hosbein | Dec. 30, 1941 |
| 2,346,638 | Wright | Apr. 11, 1944 |
| 2,508,222 | Cannon | May 16, 1950 |

FOREIGN PATENTS

| | | |
|---|---|---|
| 351,406 | Germany | Apr. 6, 1922 |

OTHER REFERENCES

Trink: Industrial Furnaces, pub. by John Wiley & Sons, Inc., Chapman & Hall, Ltd. (1951), 4th ed., page 377 relied on.